(12) United States Patent
Mitidieri et al.

(10) Patent No.: US 10,919,582 B2
(45) Date of Patent: Feb. 16, 2021

(54) AERODYNAMIC DEFLECTOR DEVICE FOR MOTOR VEHICLE WHEEL

(71) Applicant: Valeo Systemes Thermiques, Le Mesnil Saint Denis (FR)

(72) Inventors: Enzo Mitidieri, Le Mesnil Saint-Denis (FR); Sylvain Gerber, Le Mesnil Saint-Denis (FR); Nathalie Dion, Le Mesnil Saint-Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 243 days.

(21) Appl. No.: 16/060,581

(22) PCT Filed: Nov. 8, 2016

(86) PCT No.: PCT/FR2016/052892
§ 371 (c)(1),
(2) Date: Apr. 12, 2019

(87) PCT Pub. No.: WO2017/103357
PCT Pub. Date: Jun. 22, 2017

(65) Prior Publication Data
US 2019/0233025 A1    Aug. 1, 2019

(30) Foreign Application Priority Data

Dec. 17, 2015  (FR) ...................... 1562574

(51) Int. Cl.
*B62D 35/02* (2006.01)

(52) U.S. Cl.
CPC ............... *B62D 35/02* (2013.01); *Y02T 10/82* (2013.01); *Y02T 10/88* (2013.01)

(58) Field of Classification Search
CPC ....... B62D 35/02; B62D 35/005; Y02T 10/82; Y02T 10/88
(Continued)

(56) References Cited

FOREIGN PATENT DOCUMENTS

| EP | 2 607 215 A2 | 6/2013 |
|---|---|---|
| FR | 2 858 793 A1 | 2/2005 |

(Continued)

OTHER PUBLICATIONS

Machine translation of FR 793 from espacenet (Year: 2005).*
(Continued)

*Primary Examiner* — Hilary L Gutman
(74) *Attorney, Agent, or Firm* — Osha Bergman Watanabe & Burton LLP

(57) ABSTRACT

An aerodynamic deflector device for a motor vehicle wheel may include a mounting configured to be mounted on a motor vehicle. A deflecting wall may be mounted on the mounting to be movable between a retracted position. In the mounted state, the deflecting wall is raised relative to the mounting, and an extended position in which, in the mounted state, the deflecting wall is lowered relative to the mounting and capable of being placed upstream from the wheel of the vehicle. An actuator may be configured to move the deflecting wall between the retracted and extended positions. The deflecting wall may have, in cross-section, a central part and two side parts flaring out from the central part to obtain a shape which diverges with respect to the direction of the air flow striking said wall. The aerodynamic deflector device may be arranged upstream from a vehicle wheel.

9 Claims, 7 Drawing Sheets

(58) Field of Classification Search
USPC .................................................. 296/180.5
See application file for complete search history.

(56) References Cited

FOREIGN PATENT DOCUMENTS

| FR | 3071471 A1 * | 3/2019 | ........... B62D 35/005 |
| JP | S63-111378 U | 7/1988 | |
| JP | 2006-069396 A | 3/2006 | |
| JP | 2008-279819 A | 11/2008 | |

OTHER PUBLICATIONS

International Search Report issued in PCT/FR2016/052892 dated Jan. 4, 2017 (3 pages).
Written Opinion of the International Searching Authority issued in PCT/FR2016/052892 dated Jan. 4, 2017 (6 pages).

* cited by examiner

AERODYNAMIC DEFLECTOR DEVICE FOR MOTOR VEHICLE WHEEL

CROSS-RELATED APPLICATIONS

Background

The invention relates to an aerodynamic deflector device for a motor vehicle wheel.

A constant preoccupation in the automotive sector is that of fuel consumption and the ecological impact of the vehicle in particular due to its emissions of greenhouse-effect gases such as CO2 or due to toxic gases such as NOx, for example. In order to reduce fuel consumption, automobile manufacturers have been attempting, on the one hand, to make the propulsion engines more efficient and, on the other hand, to reduce the consumption of the equipment of the vehicle.

An important factor in the consumption of a vehicle is determined by the wind loading or the aerodynamics of the vehicle.

Specifically, the aerodynamics of a motor vehicle is an important characteristic since it particularly influences the fuel consumption (and therefore pollution) and also the performance, in particular acceleration performance, of said vehicle.

In particular, drag or aerodynamic resistance to forward travel plays a decisive role, in particular at higher speeds, since drag varies as a function of the square of the speed of movement of the vehicle.

According to the models used in fluid mechanics, it is possible for example to quantify the drag force which is exerted on a motor vehicle with the aid of a reference area S. In a first approximation, the drag force, termed Fx, is equal to $q*S*Cx$, where q denotes the dynamic pressure ($q=\frac{1}{2}\rho*V^2$, $\rho$ denoting the density of the air and V the speed of the vehicle with respect to the air), Cx denoting a coefficient of drag specific to the vehicle.

The reference area used for a motor vehicle usually corresponds to its frontal area. It will therefore be understood that, in order to reduce drag, it is necessary to aim at reducing the reference area.

A more detailed analysis of the aerodynamic phenomena has also made it possible to bring to light the decisive role of the vehicle wheels.

Specifically, the wheels considerably increase the aerodynamic resistance since they generate turbulence when the air flow strikes the rotating wheel. At high speeds, it has been demonstrated that the front wheels can contribute up to a value of 30% to the reference area.

Specifically, when a motor vehicle is moving, the air in which it travels is deflected according to the profile of the vehicle. The air thus deflected particularly reaches the wheel housing. The wheel housing is a cavity formed in the body of the vehicle and surrounding a wheel (this corresponds to the fender of the vehicle). The wheel housing performs a number of functions. It limits in particular (by retaining them) the projections of water, of mud or of other materials on which the wheel is likely to circulate and which it can be led to expel during its rotation. The air reaching the wheel housing circulates in particular in the narrow space separating the wheel from the wheel housing. It is known that, as this takes place, turbulence forms around the wheel revolutions and creates an aerodynamic brake.

It is known to place a fixed deflector in front of a motor vehicle wheel. Such a fixed deflector, which can take the form of a skirt (often of about 5 cm in height), makes it possible to reduce the turbulence in the wheel housing.

However, such a fixed deflector risks being damaged when crossing obstacles (sidewalk, speed-reducing device of the speed hump type, etc.).

To solve this problem, a deflector device equipped with an actuator can be envisioned.

However, it is necessary to ensure that it is possible to optimize the design of the actuator both in terms of bulk and electrical consumption.

SUMMARY OF DISCLOSURE

The present invention aims at at least partially overcoming some of the disadvantages described above by proposing an aerodynamic deflector device equipped with an actuator whose size and power can be limited.

Accordingly, the subject of the invention is an aerodynamic deflector device for a motor vehicle wheel, comprising:
- a support configured to be mounted on a motor vehicle,
- a deflecting wall mounted on the support so as to be movable between, on the one hand, a retracted position in which, in the mounted state, said deflecting wall is raised with respect to the support, and, on the other hand, a deployed position in which, in the mounted state, said deflecting wall is lowered with respect to the support and able to be placed upstream of the wheel of the vehicle, An actuator configured to move said deflecting wall between the retracted and deployed positions, According to the invention, the deflecting wall has, in cross section, a central part, in particular intended to be arranged upstream of the wheel in the mounted state of the device, and two lateral parts flaring out from the central part so as to obtain a divergent shape in the direction of the air flow striking said wall.

Owing to the aerodynamic shape of the deflecting wall itself, the actuator can thus have a reduced bulk, power and consumption since the forces for moving the wall are minimized.

The aerodynamic deflector device according to the invention can comprise one or more of the features described below, taken alone or in combination.

According to one aspect of the invention, in cross section, the lateral parts of the deflecting wall are curved.

According to another aspect of the invention, the lateral parts of the deflecting wall are curved in a concave manner.

According to another aspect of the invention, the lateral part of the deflecting wall intended to be on the engine compartment side has a greater lateral extension than the other lateral part of the deflecting wall.

According to another aspect of the invention, the central part of the deflecting wall has, in longitudinal section, a circular arc shape.

According to another aspect of the invention, the deflecting wall is connected to the support via a pivot axis, and in that the actuator is coupled directly to this pivot axis.

According to another aspect of the invention, the deflecting wall is connected to the support via pivot bearings and the actuator comprises an output lever having at its free end a pin cooperating with a movement rail of the deflecting wall.

According to another aspect of the invention, the movement rail has an oblong hole into which the pin borne by the output lever penetrates.

According to another aspect of the invention, the device described above additionally comprises a closure wall connecting the two lateral walls that is opposite to the central part.

According to another aspect of the invention, the movement rail is borne by the closure wall.

According to another aspect of the invention, the oblong hole extends parallel to the closure wall, and in that, in the deployed position, the output lever is oriented perpendicularly with respect to the closure wall.

The invention also relates to a motor vehicle which comprises at least one aerodynamic deflector device as described above that is arranged upstream of a vehicle wheel.

Other advantages and features will become apparent on reading the description of the invention and from the appended drawings, in which:

DETAILED DESCRIPTION

In the description, identical elements are identified by the same reference numbers.

In the present description, "upstream" is intended to mean that an element is placed before another with respect to the direction of circulation of the air flow. By contrast, "downstream" is intended to mean that an element is placed after another with respect to the direction of circulation of the air flow. The terms "upper", "lower", "top" and "bottom" refer to the arrangement of the elements in the figures, which generally corresponds to the arrangement of the elements in the mounted state in a motor vehicle.

The following embodiments are examples. Although the description refers to one or more embodiments, this does not necessarily mean that each reference relates to the same embodiment, or that the features apply only to just one embodiment. Single features of various embodiments can also be combined or interchanged in order to create other embodiments A reference marker, for example LH, LT, LH or LTH, in a figure respectively indicates the longitudinal (L), transverse (T) and height (H) directions corresponding to x-y-z directions of the vehicle.

In the description, certain elements or parameters can be indexed, such as, for example, first element or second element and also first parameter and second parameter or else first criterion or second criterion, etc. In this case, what is concerned is a simple indexing to differentiate and denominate elements or parameters or criteria which are similar but not identical. This indexing does not imply a priority of one element, parameter or criterion with respect to another and such denominations may easily be interchanged without departing from the scope of the present description. This indexing also does not imply an order in time.

Figure 1A:
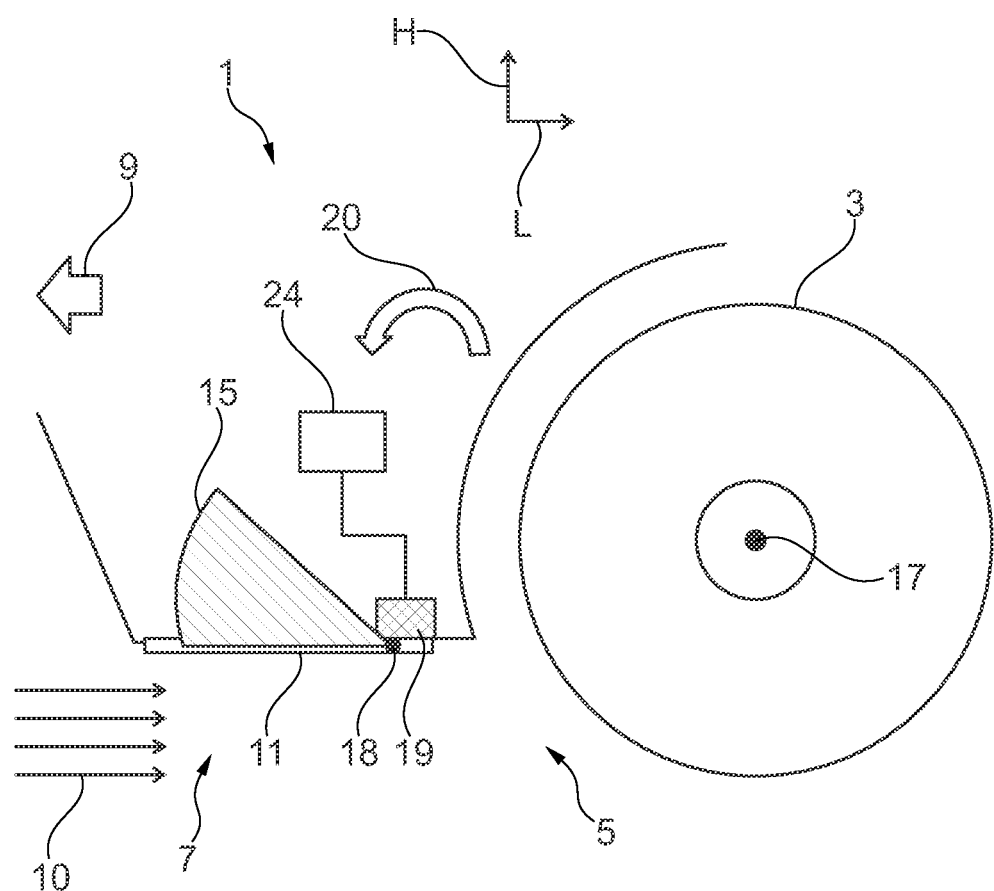
FIGS. 1A, 1B show side diagrams of the aerodynamic deflector device according to a first embodiment in two different positions.

FIG. 1A shows a simplified side diagram of a front part 1 of a motor vehicle, in particular a wheel 3 and a wheel housing 5 provided with an aerodynamic deflector device 7 for the wheel.

In the diagram of FIG. 1A, the vehicle moves in the direction of the arrow 9, with the result that an air flow 10 impacts the vehicle and in particular the wheel 3 in the opposite direction.

The aerodynamic deflector device 7 comprises a support 11 configured to be, for example, fixed to the chassis of the vehicle upstream of the wheel 3, and in particular at the level of the wheel housing 5.

As will be better visible from FIG. 2A to 2C or 3A to 3C, in the present embodiment the support 11 is produced for example as a frame or plate configured to be fixed to the vehicle, for example by screwing or by clamps or any other fixing means.

The aerodynamic deflector device 7 further comprises a deflecting wall 15. In the case where the support 11 is produced as a virtually solid plate, provision is made to form an opening in the plate having a contour so as to allow the deflecting wall 15 to pass through this opening.

Figure 1B:
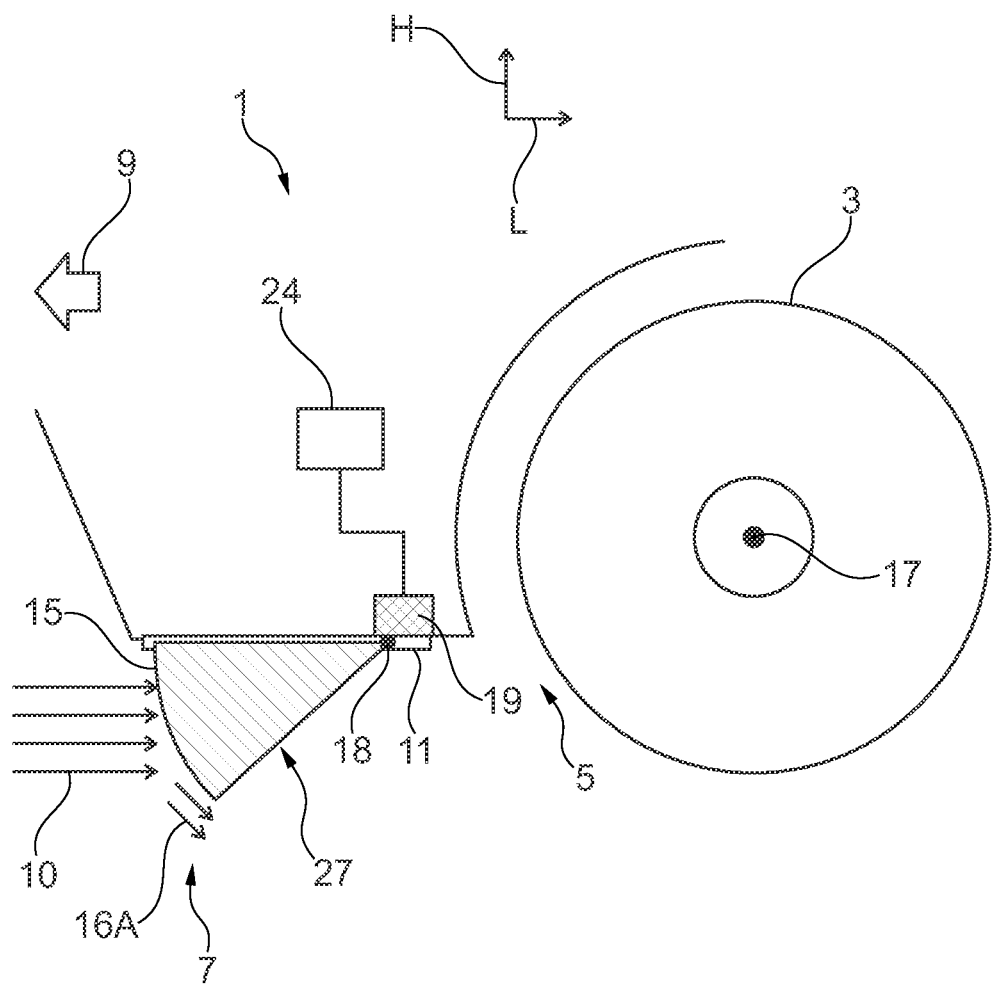

As can be seen in FIGS. 1A, 1B, this deflecting wall 15 has a general circular arc shape when seen in longitudinal section, that is to say in the direction of the length of the deflecting wall 15, here in the "L" direction.

Figure 1C:
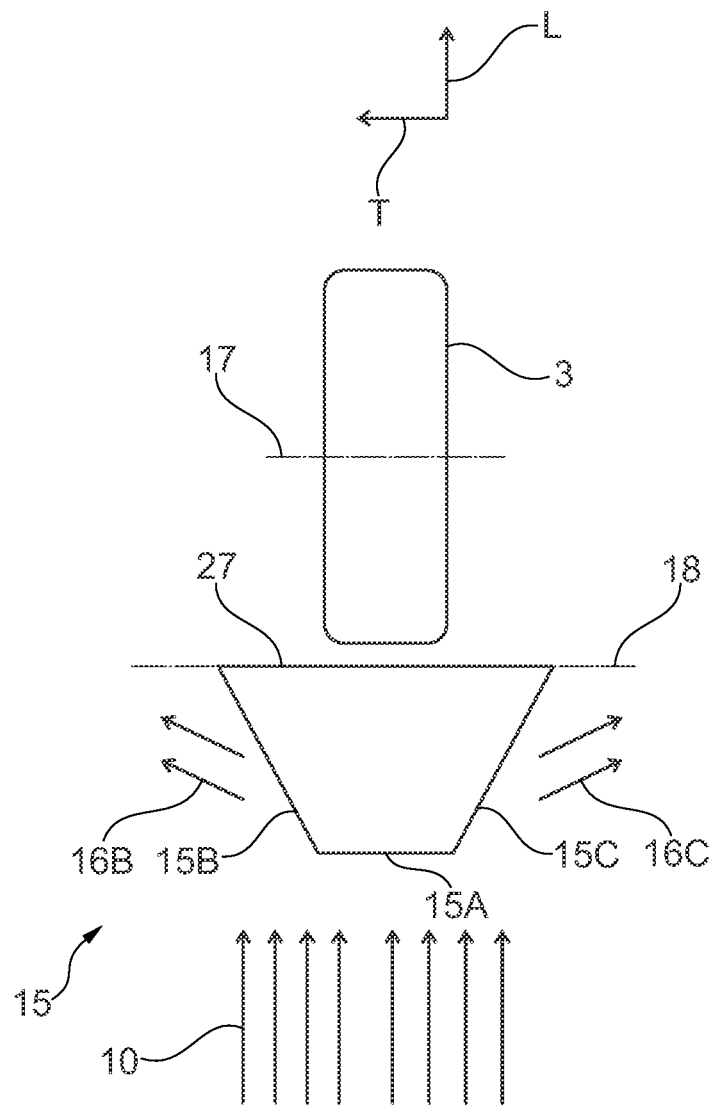
FIG. 1C shows a simplified top view diagram of the device of FIG. 1B, FIGS. 2A and 2B show perspective side diagrams of the aerodynamic deflector device according to a second embodiment in two different positions.

As can be seen in FIG. 1C, the deflecting wall 15 has, in cross section in the "T" direction, a central part 15A intended to be arranged upstream of the wheel 3 in the mounted state of the device 1, and two lateral parts 15B and 15C flaring out from the central part so as to obtain a divergent shape in the direction of the air flow 10 striking said wall 15.

In the present embodiment, the deflecting wall 15 has, in cross section in the "T" direction, a trapezoid shape, in particular an isosceles trapezoid shape, that is to say that the length of the lateral part 15B which is situated on the engine compartment side is the same as that of the lateral part 15C which is situated on the outer side of the vehicle.

These lateral parts 15B and 15C have the function of laterally deflecting the air flow 10 striking the deflecting wall 15, as indicated by the arrows 16B and 16C, whereas the central part 15A directs the air flow toward the ground (see arrows 16A of FIG. 1B).

The free ends of the lateral parts 15B and 15C are articulated about a pivot axis 18 such that the deflecting wall 15 is mounted on the support 11 so as to be movable between, on the one hand, a retracted position (FIG. 1A) in which, in the mounted state, said deflecting wall 15 is raised, and, on the other hand, a deployed position (FIG. 1B) in which, in the mounted state, said deflecting wall 15 is lowered and placed upstream of the wheel 3 of the vehicle. In the mounted state of the aerodynamic deflector device, the pivot axis 18 is substantially parallel to the transverse axis "T" of the vehicle.

In the retracted position, the deflecting wall 15 is raised into a receptacle situated upstream of the wheel housing 5 and therefore does not form any obstacle to the air flow 10 impacting the wheel 5.

This retracted position is generally adopted for speeds which are not very high, for example below 50 km/h.

Specifically, for low speeds, the effect of the deflecting wall 15 is of little importance, in particular with respect to the reference area.

Moreover, it is at these speeds below about 50 km/h that obstacles are crossed, such as, for example, sidewalks, speed-reducing devices of the speed hump type, speed cushion type, etc. By assuming the retracted position at these low speeds, the deflecting wall 15 is protected against breakage.

In the lowered or deployed position shown in FIG. 1B, the deflecting wall 15 is placed upstream of the wheel 3 of the vehicle while being at least partially below the axis of rotation 17 of said wheel 3.

It is in this lowered or active position that the air flow 11 is deflected so as not to be able to sweep into the wheel housing 5.

More precisely, it is deflected downward in the direction of the ground as far as the central part 15A is concerned (see arrow 16A of FIG. 1B) and laterally in the direction of the engine compartment as far as the wall 15B is concerned (see arrows 16B of FIG. 1C) and toward the outside as far as the wall 15C is concerned (see arrows 16C of FIG. 1C).

In particular, the air flow 16B is advantageous since it can contribute to cooling the engine compartment.

There is thus avoided the creation in the wheel housing 5 of turbulence which contributes to the significant increase of the reference area.

Moreover, the deflecting wall 15 itself is more aerodynamic. On the one hand, this is advantageous since that reduces the force necessary for its movement between the retracted and deployed positions.

Thus, the drag force overall can be contained to more acceptable values.

On the other hand, that also makes it possible to provide a thinner deflecting wall 15 since the forces exerted on this deflecting wall 15 are smaller.

In order, for example, to avoid mud being able to accumulate within the volume defined by the deflecting wall 15, there is further provided a closure wall 27 connecting the lower edges of the central part 15A and lateral parts 15B and 15C.

In order to be able to effect the movement between the retracted position (FIG. 1A) and the deployed position (FIG. 1B), the aerodynamic deflector device comprises an actuator 19 which is coupled directly to the pivot axis 18 to rotate (see arrow 20 of FIG. 1A) the deflecting wall 15 from its retracted position toward the deployed position.

Owing to the aerodynamic shape of the deflecting wall 15 itself, this actuator 19 can have a smaller bulk, power and consumption since the forces for moving the wall 15 are not very high.

The actuator 19 is, for example, an electric motor with a rotary output member in direct or indirect engagement with the axis of rotation 17.

The actuator 19 is, for example, connected to a control unit 24 comprising, for example, an electronic circuit such as a microprocessor or a microcontroller receiving speed information from a speed sensor and ordering the deployment or the retraction of the deflecting wall 15 as a result.

According to one possible embodiment, a hysteresis mechanism is provided in order to avoid threshold effects. Thus, it is possible to make provision for the control unit 24 to trigger the deployment of the deflecting wall 15 as soon as the speed exceeds a given threshold (for example 50 km/h), but for the retraction of the deflector to be triggered only when the speed drops again below a threshold below the aforementioned threshold (for example a threshold of 40 km/h).

Thus, the circuit avoids triggering alternations of deployment and retraction in an untimely manner when the vehicle is travelling at a speed close to the initial threshold and passes permanently from either side of this threshold.

The threshold for triggering the deployment (for example 50 km/h) is chosen so as to be sufficiently high for the deployment to have a perceptible effect on aerodynamic drag. Drag varies with the square of the speed. For low speeds, drag is itself very low. Deploying the deflector is then not useful.

The threshold for triggering the retraction (for example 40 km/h) is chosen so as to be sufficiently high for the driver to be able to reasonably envision the crossing of obstacles (sidewalks, speed humps, etc.) at the speed in question. Thus, a situation is avoided in which the motor vehicle is caused to cross such an obstacle (of the kind to damage the deflector) while the deflector is deployed.

According to yet another variant, the control unit 24 also receives geolocation data associated with information on the driving situation.

Thus, for example, the control unit 24 can be configured to inhibit any deployment of the deflecting wall 15 in built-up areas where the speed is limited. Specifically, it is in built-up areas that there is more risk of having to cross obstacles which can damage the deflecting wall 15.

It will therefore be understood that the aerodynamic deflector device 7 according to the invention makes it possible to improve aerodynamic drag of the vehicle and therefore in particular the fuel consumption of the vehicle while, by virtue of its controlled or active character, allowing the crossing of obstacles at low speed with full security.

FIGS. 2A to 2D show an aerodynamic deflector device according to a second embodiment.

Figure 2A:
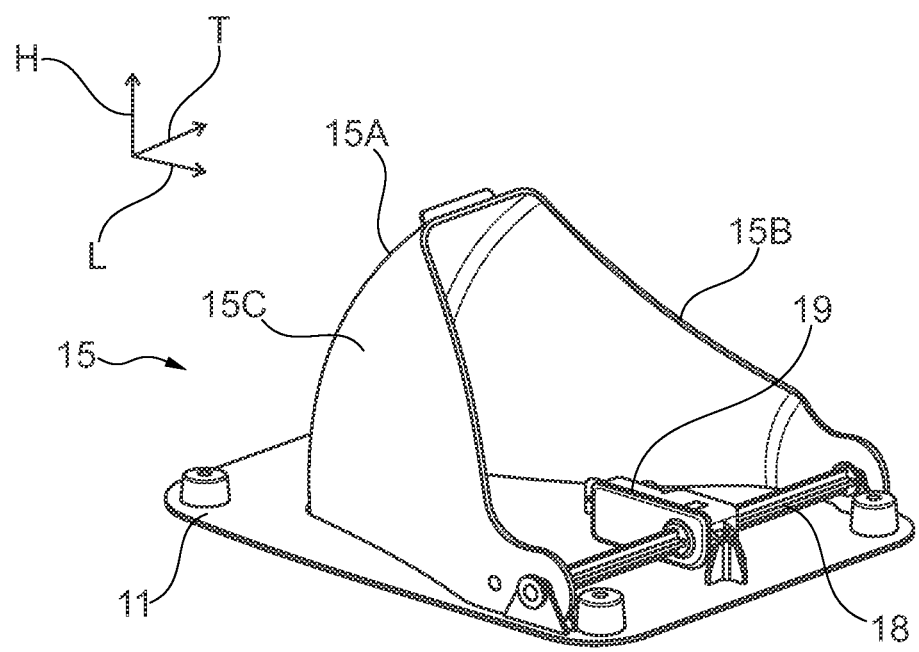
FIG. 2C shows a perspective diagram in a front view of the device of FIG. 2B.
FIG. 2D shows a view in cross section of the deflecting wall of the device of FIG. 2B, FIGS. 3A and 3B show perspective side diagrams of the aerodynamic deflector device according to a third embodiment in two different positions.
Figure 2B:
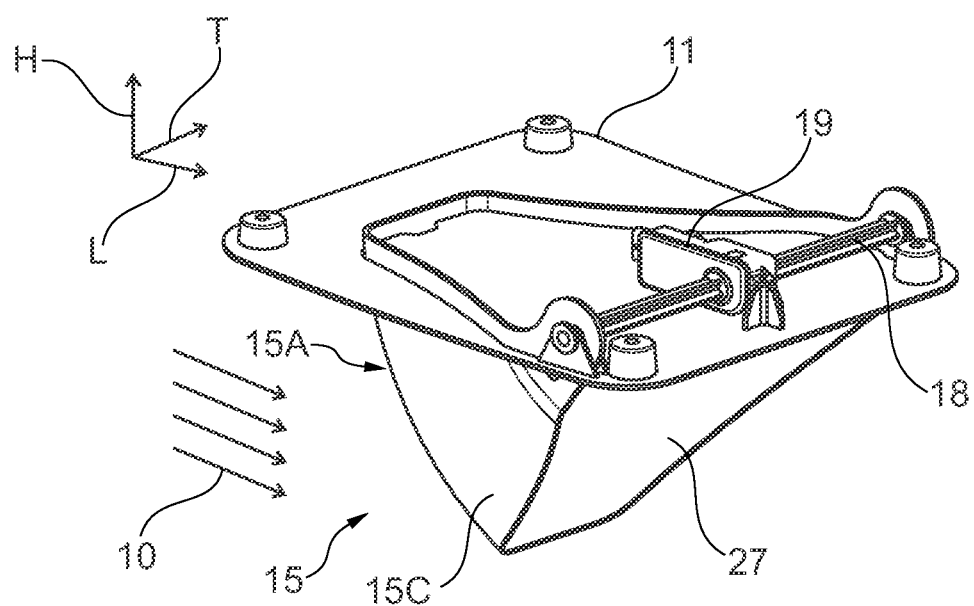

FIGS. 2A and 2B show prospective side diagrams of the aerodynamic deflector device in the retracted position and in the deployed position, respectively.

This embodiment is distinguished from that of FIGS. 1A to 1C through a different shape of the lateral parts 15B and 15C of the deflecting wall 15.

Figure 2C:
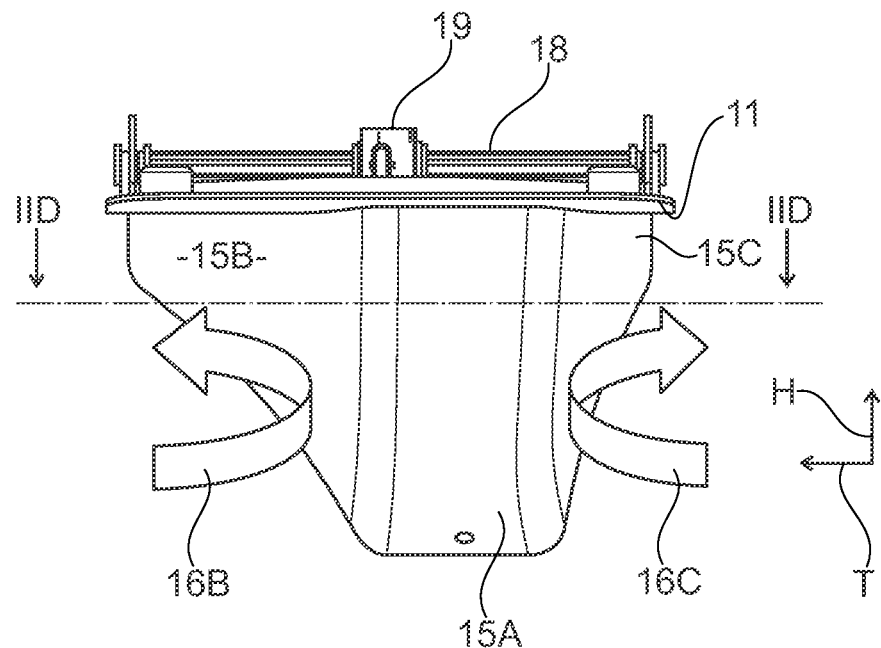
Figure 2D:
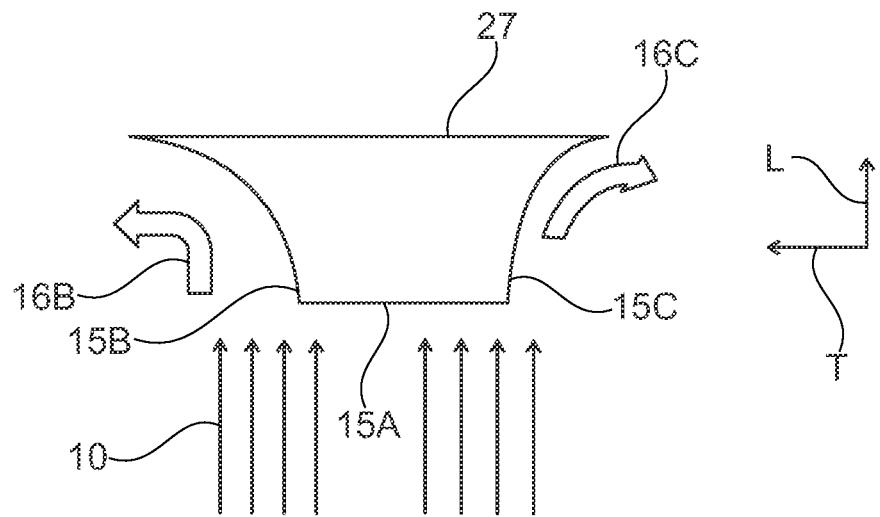

As is most visible from FIGS. 2C and 2D respectively showing, on the one hand, a perspective front view of the aerodynamic deflector device in the deployed position and, on the other hand, a view in cross section of the deflecting wall 15 along the line IID-IID of FIG. 2C, that is to say in a view in section parallel to a horizontal plane "L-T" of the vehicle, the lateral parts 15B and 15C of the deflecting wall 15 are curved in cross section, more specifically in a concave manner.

This rounded shape makes it possible to better guide the air flow 10 in a direction which substantially parallel to the transverse axis "T" of the vehicle, in particular for the deflected air flow 16B. It is thus possible to deflect the air flow 10 by about 90° toward the engine compartment of the vehicle.

In order for the contribution to the cooling of the engine compartment to be able to be further optimized, the lateral part 15B of the deflecting wall 15 intended to be on the engine compartment side has a greater lateral extension than the extension of the other lateral part 15C of the deflecting wall 15.

It can be seen from FIGS. 2A, 2B and 2C that the pivot axis 18 comprises a rod, or a set of rods which define the pivot axis, with the actuator 19 being coupled directly to the pivot axis 18, and to the rod, to rotate the deflecting wall 15 from its retracted position (FIG. 2A) toward the deployed position (FIG. 2B).

Figure 3A:
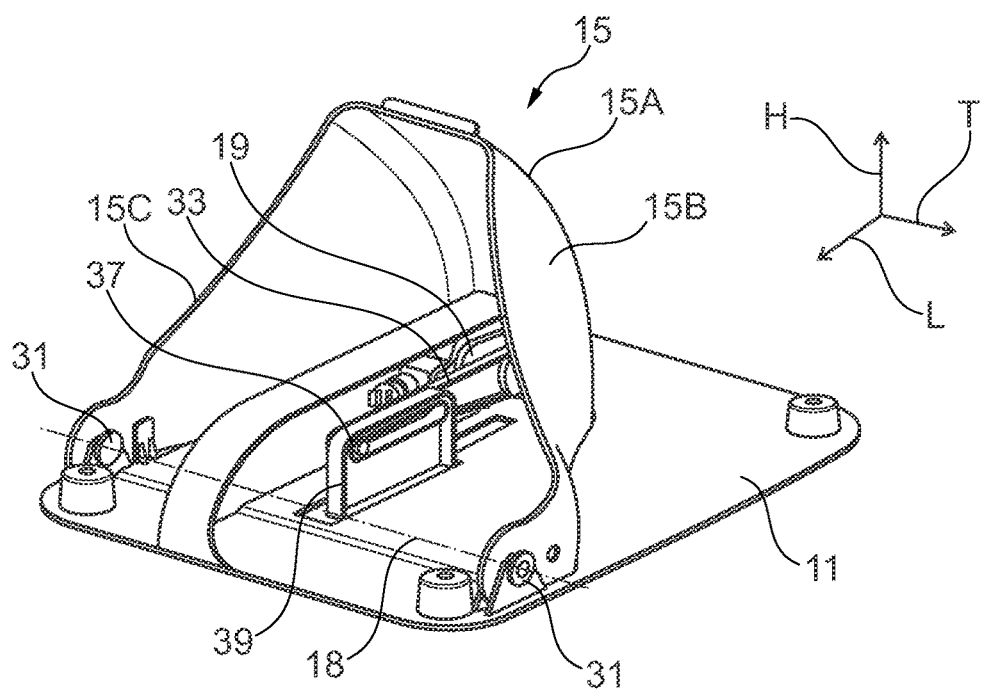
FIG. 3C shows a perspective diagram in a view in longitudinal section of the device of FIG. 3B.
Figure 3B:
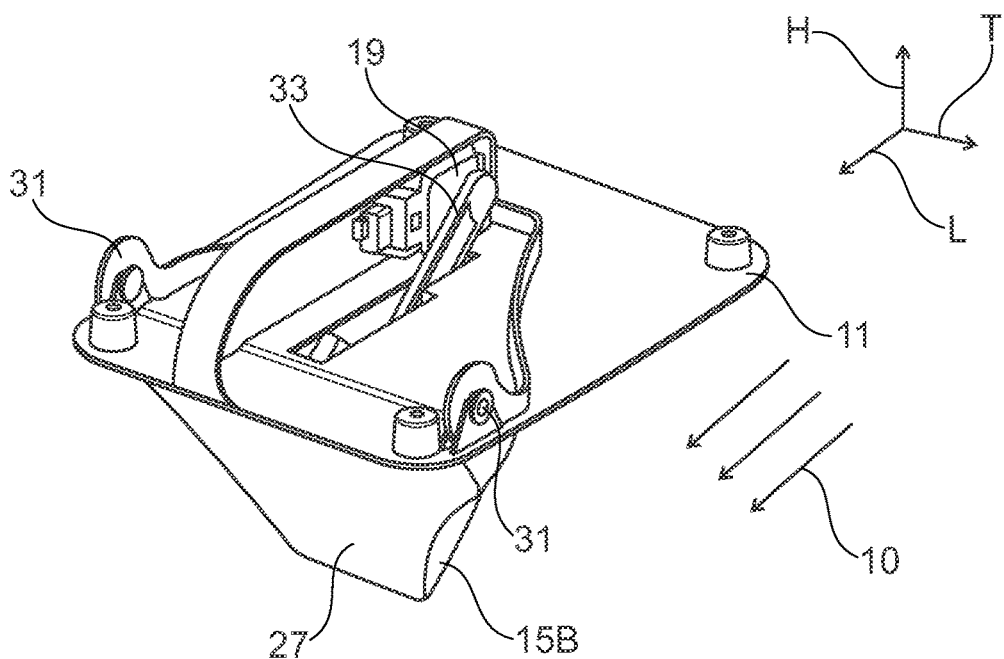
Figure 3C:
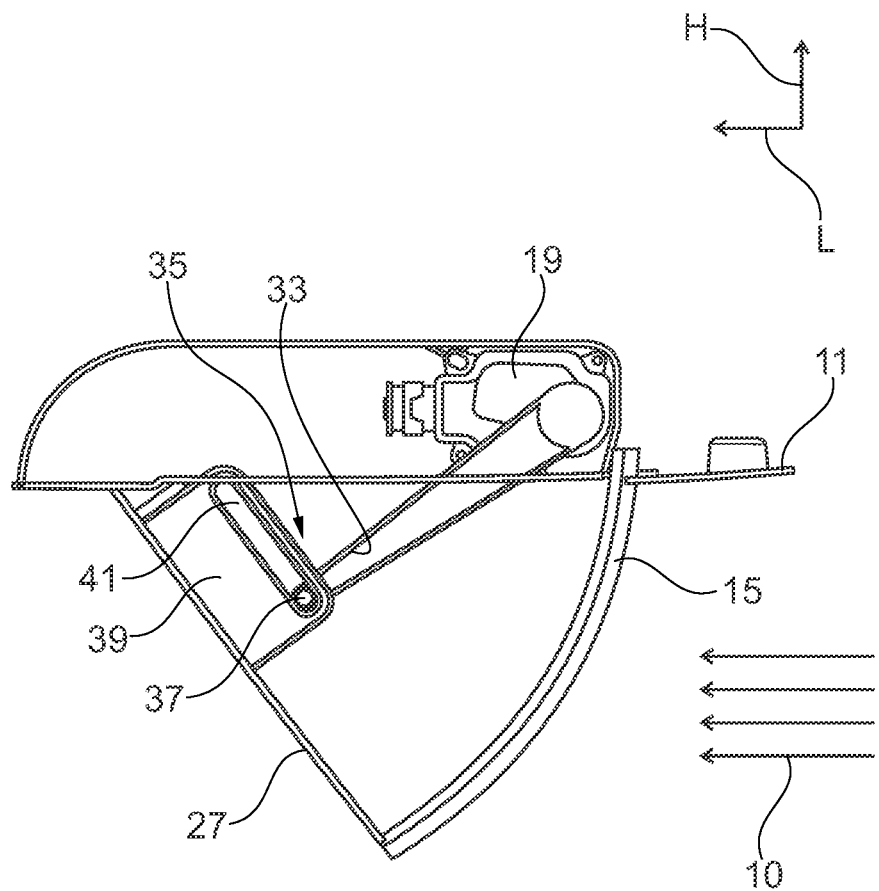

FIGS. 3A to 3C show a third embodiment of the aerodynamic deflector device 7.

This embodiment is distinguished from that of FIGS. 2A to 2D through the drive mechanism for the deflecting wall 15.

The deflecting wall 15 is connected to the support 11 in the form of a plate via pivot bearings 31 which define the pivot axis 18 of the deflecting wall 15.

As can be seen distinctly from FIG. 3C, the actuator 19 is positioned close to the deflecting wall 15 and comprises an output lever 33 oriented toward the rear and having at its free end 35 a pin 37 cooperating with a movement rail 39 of the deflecting wall 15. The actuator 19 is therefore coupled indirectly to the pivot axis 18.

The movement rail 39 is borne by the closure wall 27 and has an oblong hole 41 into which the pin 37 borne by the output lever 33 penetrates.

The oblong hole 41 extends parallel to the closure wall 27.

This has the advantage that the output lever 33 with its pin 37 can benefit from an increasing lever effect as the pin 37 advances in the oblong hole 41. Specifically, the bearing position of the pin 37 in the oblong hole 41 moves away from the pivot axis 18 during the movement of the deflecting wall from its retracted position toward the deployed position.

In the deployed position (FIGS. 3B and 3C), the output lever 33 is oriented perpendicularly with respect to the closure wall 27.

This makes it possible as it were to lock the deployed position and to relieve the actuator 19 such that no force has to be exerted by the actuator 19 to keep the deflecting wall 15 in the deployed position.

It will be understood that the aerodynamic deflector device is distinguished by its simplicity, its efficiency and its ease of implementation.

What is claimed:

1. An aerodynamic deflector device for a motor vehicle wheel, comprising:
    a support configured to be mounted on a motor vehicle;
    a deflecting wall mounted on the support so as to be movable between a retracted position in which, in the mounted state, said deflecting wall is raised with respect to the support, and a deployed position in which, in the mounted state, said deflecting wall is lowered with respect to the support and able to be placed upstream of the wheel of the vehicle;
    an actuator configured to move said deflecting wall between the retracted and deployed positions,
    wherein the deflecting wall has, in cross section, a central part and two lateral parts flaring out from the central part to obtain a divergent shape in the direction of the air flow striking said deflecting wall,
    wherein the deflecting wall is connected to the support via pivot bearings and the actuator comprises an output lever having at a free end a pin cooperating with a movement rail of the deflecting wall; and
    a closure wall, opposite to the central part, that connects the two lateral parts,
    wherein an oblong hole extends parallel to the closure wall, and in the deployed position, the output lever is oriented perpendicularly with respect to the closure wall.

2. The device as claimed in claim 1, wherein, in cross section, the lateral parts of the deflecting wall are curved.

3. The device as claimed in claim 2, wherein the lateral parts of the deflecting wall are curved in a concave manner.

4. The device as claimed in claim 3, wherein the lateral part of the deflecting wall on the engine compartment side has a greater lateral extension than the other lateral part of the deflecting wall.

5. The device as claimed in claim 1, wherein the central part of the deflecting wall has, in longitudinal section, a circular arc shape.

6. The device as claimed in claim 1, wherein the deflecting wall is connected to the support via a pivot axis, and wherein the actuator is coupled directly to this pivot axis.

7. The device as claimed in claim 1, wherein the movement rail comprises the oblong hole into which the pin borne by the output lever penetrates.

8. The device as claimed in claim 1, wherein the movement rail is borne by the closure wall.

9. A motor vehicle, comprising: at least one aerodynamic deflector device as claimed in claim 1 that is arranged upstream of a vehicle wheel.

\* \* \* \* \*